United States Patent
Lin et al.

(10) Patent No.: US 12,324,052 B2
(45) Date of Patent: Jun. 3, 2025

(54) ENHANCEMENTS ON USER EQUIPMENT (UE) HANDLING OF NON-ACCESS STRATUM (NAS) SIGNALING CONNECTION RELEASE

(71) Applicant: MEDIATEK INC., Hsinchu (TW)

(72) Inventors: Yuan-Chieh Lin, Hsinchu (TW); Chien-Chun Huang-Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 557 days.

(21) Appl. No.: 17/573,239

(22) Filed: Jan. 11, 2022

(65) Prior Publication Data

US 2022/0264698 A1     Aug. 18, 2022

Related U.S. Application Data

(60) Provisional application No. 63/150,166, filed on Feb. 17, 2021.

(51) Int. Cl.
*H04W 76/38*     (2018.01)
*H04W 48/08*     (2009.01)
*H04W 88/06*     (2009.01)

(52) U.S. Cl.
CPC .......... *H04W 76/38* (2018.02); *H04W 48/08* (2013.01); *H04W 88/06* (2013.01)

(58) Field of Classification Search
CPC ............................... H04W 48/08; Y02D 30/70
See application file for complete search history.

(56) References Cited

U.S. PATENT DOCUMENTS

| | | | |
|---|---|---|---|
| 2019/0306823 A1 | 10/2019 | Babu et al. | |
| 2020/0245235 A1 | 7/2020 | Chun | |
| 2020/0314701 A1 | 10/2020 | Talebi Fard et al. | |
| 2020/0351980 A1* | 11/2020 | Talebi Fard | H04W 76/40 |
| 2021/0250890 A1* | 8/2021 | Won | H04W 76/50 |
| 2021/0360371 A1* | 11/2021 | Qiao | H04W 4/029 |
| 2022/0345989 A1* | 10/2022 | Tiwari | H04W 48/02 |
| 2023/0171598 A1* | 6/2023 | Normann | H04W 8/18 |
| | | | 455/410 |

FOREIGN PATENT DOCUMENTS

CN     110583058 A     12/2019

OTHER PUBLICATIONS

TW Office Action dated Jun. 30, 2022 in Taiwan application No. 111105535.

(Continued)

*Primary Examiner* — Fabricio R Murillo Garcia
(74) *Attorney, Agent, or Firm* — McClure, Qualey & Rodack, LLP

(57) ABSTRACT

A method for enhancing User Equipment (UE) handling of Non-Access Stratum (NAS) signaling connection release is provided. A UE establishes a NAS signaling connection with a mobile communication network belonging to a Public Land Mobile Network (PLMN). The UE receives a NAS message including a Closed Access Group (CAG) information list from the mobile communication network while camping on a CAG cell. The UE starts a timer in response to determining that no entry for the current PLMN is included in the received CAG information list. The UE locally releases the established NAS signaling connection upon expiry of the timer.

12 Claims, 4 Drawing Sheets

(56) References Cited

OTHER PUBLICATIONS

Chinese language office action dated Dec. 6, 2024, issued in application No. CN 202210103048.X.
Huawei, et al.; "AN Release triggered by CAG information Update;" 3GPP TSG-CT WG1 Meeting #127-e; Nov. 2020; pp. 1-13.
China Mobile; "The handling of CAG information list with no entry; " 3GPP TSG-CT WG1 Meeting #127-e; Nov. 2020; pp. 1-33.

* cited by examiner

ENHANCEMENTS ON USER EQUIPMENT (UE) HANDLING OF NON-ACCESS STRATUM (NAS) SIGNALING CONNECTION RELEASE

CROSS REFERENCE TO RELATED APPLICATIONS

This application claims priority under 35 U.S.C. § 119 from U.S. Provisional Application No. 63/150,166, entitled "T3540 AN Release on a CAG cell when CAG information Update with no entry or without the entry of the Registered PLMN", filed on Feb. 17, 2021, the subject matter of which is incorporated herein by reference.

BACKGROUND OF THE APPLICATION

Field of the Application

The application generally relates to mobile communications, and more particularly, to enhancements on User Equipment (UE) handling of Non-Access Stratum (NAS) signaling connection release.

Description of the Related Art

In a typical mobile communication environment, a UE (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the 3rd Generation Partnership Project (3GPP). It is designed to better support mobile broadband Internet access by improving spectral efficiency, reducing costs, and improving services.

As private networks become a popular choice in various vertical industries to build dedicated and secure wireless networks in industry environments, 3GPP specifies Public Network Integrated Non-Public Networks (PNI-NPN) as a type of private networks which are deployed with the support of Public Land Mobile Networks (PLMNs) using a Closed Access Group (CAG). In 5G NR, a PNI-NPN/CAG capable UE may be provisioned by the network with a CAG information list consisting of zero or more entries, each containing a PLMN ID and an allowed CAG list which includes zero or more CAG IDs of CAG cells that the UE is allowed to access in the PLMN having the PLMN ID. The UE may perform network selection and reselection based on the PLMN ID(s), and perform cell selection and reselection, access control based on the CAG ID(s) in the allowed CAG list(s).

In cases where the CAG information list is updated when the UE is registered with a PLMN via a CAG cell, if the updated CAG information list does not include any entry containing the identity of the current PLMN and the network does not trigger the UE to release the established Non-Access Stratum (NAS) signaling connection, the UE will not be able to enter the 5GMM-IDLE mode in which the UE is allowed to search for a suitable cell as mandated by 3GPP standards. Consequently, the UE will be stuck in the CAG cell that it is not allowed to access anymore, causing the UE to be unable to obtain normal services.

A solution is sought.

BRIEF SUMMARY OF THE APPLICATION

The present application proposes that, in cases where the updated CAG information list does not include any entry containing the identity of the current PLMN and the network does not trigger the UE to release the established NAS signaling connection, the UE may start a guard timer (e.g., T3540) and locally release the established NAS signaling connection upon expiry of the guard timer. Advantageously, the UE will be able to enter the 5GMM-IDLE mode to perform the needed search for a suitable cell to obtain normal services.

In one aspect of the application, a method executed by a UE is provided. The method comprises the following steps: establishing a NAS signaling connection with a mobile communication network belonging to a PLMN; receiving a NAS message comprising a CAG information list from the mobile communication network while camping on a CAG cell; starting a timer in response to determining that no entry for the current PLMN is included in the received CAG information list; and locally releasing the established NAS signaling connection upon expiry of the timer.

In another aspect of the application, a UE comprising a wireless transceiver and a controller is provided. The wireless transceiver is configured to perform wireless transmission and reception to and from a mobile communication network. The controller is configured to establish a NAS signaling connection with the mobile communication network belonging to a PLMN via the wireless transceiver, receive a NAS message comprising a CAG information list from the mobile communication network via the wireless transceiver while camping on a CAG cell, start a timer in response to determining that no entry for the current PLMN is included in the received CAG information list, and locally release the established NAS signaling connection upon expiry of the timer.

In one example, the determination that no entry for the current PLMN is included in the received CAG information list comprises: determining that there is zero entry in the received CAG information list; or determining that there is one or more entries in the received CAG information list but none of the entries is for the current PLMN.

In one example, upon expiry of the timer, the UE further enters a 5GMM-IDLE state, and searches for a suitable cell based on the received CAG information list.

In one example, the UE does not have an emergency Protocol Data Unit (PDU) session.

In one example, the NAS message is a CONFIGURATION UPDATE COMMAND message.

In one example, the timer is started upon receiving the CONFIGURATION UPDATE COMMAND message.

In one example, the timer is a timer T3540 for 5G System (5GS).

In one example, the established NAS signaling connection is an N1 NAS signaling connection for 5GS.

Other aspects and features of the present application will become apparent to those with ordinary skill in the art upon review of the following descriptions of specific embodiments of the methods and apparatuses for enhancing UE handling of NAS signaling connection release.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
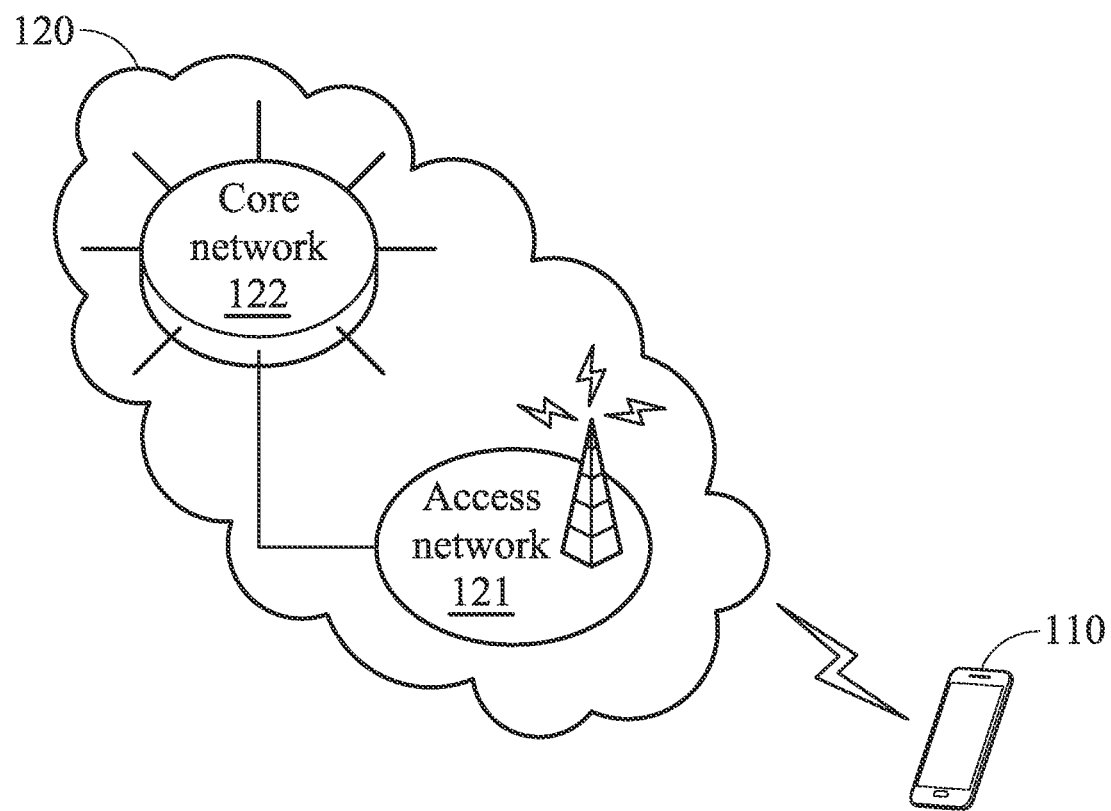
FIG. 1 is a block diagram of a mobile communication environment according to an embodiment of the application.

FIG. 1 is a block diagram of a mobile communication environment according to an embodiment of the application.

As shown in FIG. 1, the mobile communication environment 100 includes a UE 110 and a mobile communication network 120.

The UE 110 may be a feature phone, a smartphone, a panel Personal Computer (PC), a laptop computer, a Machine Type Communication (MTC) device, or any mobile communication device supporting the RAT(s) utilized by the mobile communication network 120. The UE 110 may connect to the mobile communication network 120 to obtain mobile services (e.g., voice and/or data services).

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks, such as the Internet and/or an IP Multimedia Subsystem (IMS). For example, an IMS may serve as a service delivery platform which is consisting of various network functions for providing Internet Protocol (IP) multimedia services (e.g., Voice over LTE (VoLTE)/Voice over NR (VoNR), Video over LTE (ViLTE)/Video over NR (ViNR), Short Message Service (SMS), Multimedia Messaging Service (MMS), and eXtensible Markup Language (XML) Configuration Access Protocol (XCAP), etc.) to the UE 110 over the mobile communication network 120.

In one embodiment, the mobile communication network 120 is a 5G network which integrates a PLMN and a non-public network (i.e., the non-public network is also called a PNI-NPN which is deployed with the support of a PLMN), and the access network 121 and the core network 122 may be a Next Generation Radio Access Network (NG-RAN) and a Next Generation Core Network (NG-CN) (i.e., 5G Core Network (5GC)), respectively.

The NG-RAN may include one or more gNBs. Each gNB may further include one or more Transmission Reception Points (TRPs), and each gNB or TRP may be referred to as a 5G cellular station forming one or more cells, wherein some of the cells may belong to a Closed Access Group (CAG) and may be called CAG cells, while some of the cells may be called public cells (i.e., non-CAG cells) which are accessible to all UEs subscribed to the supporting PLMN. Some gNB functions may be distributed across different TRPs, while others may be centralized, leaving the flexibility and scope of specific deployments to fulfill the requirements for specific cases.

The NG-CN may support various network functions, including an Access and Mobility Management Function (AMF), a Session Management Function (SMF), a User Plane Function (UPF), a Policy Control Function (PCF), an Application Function (AF), and an Authentication Server Function (AUSF), wherein each network function may be implemented as a network element on dedicated hardware, or as a software instance running on dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In accordance with one novel aspect, the UE 110 is allowed to start a guard timer (e.g., T3540) when it is camping on a CAG cell and receives a NAS message with a CAG information list which includes no entry for the currently registered PLMN. Upon expiry of the guard timer, the UE may locally release the established NAS signaling connection with the current PLMN, and enter the 5GMM-IDLE mode to search for a suitable cell based on the received CAG information list.

Figure 2:
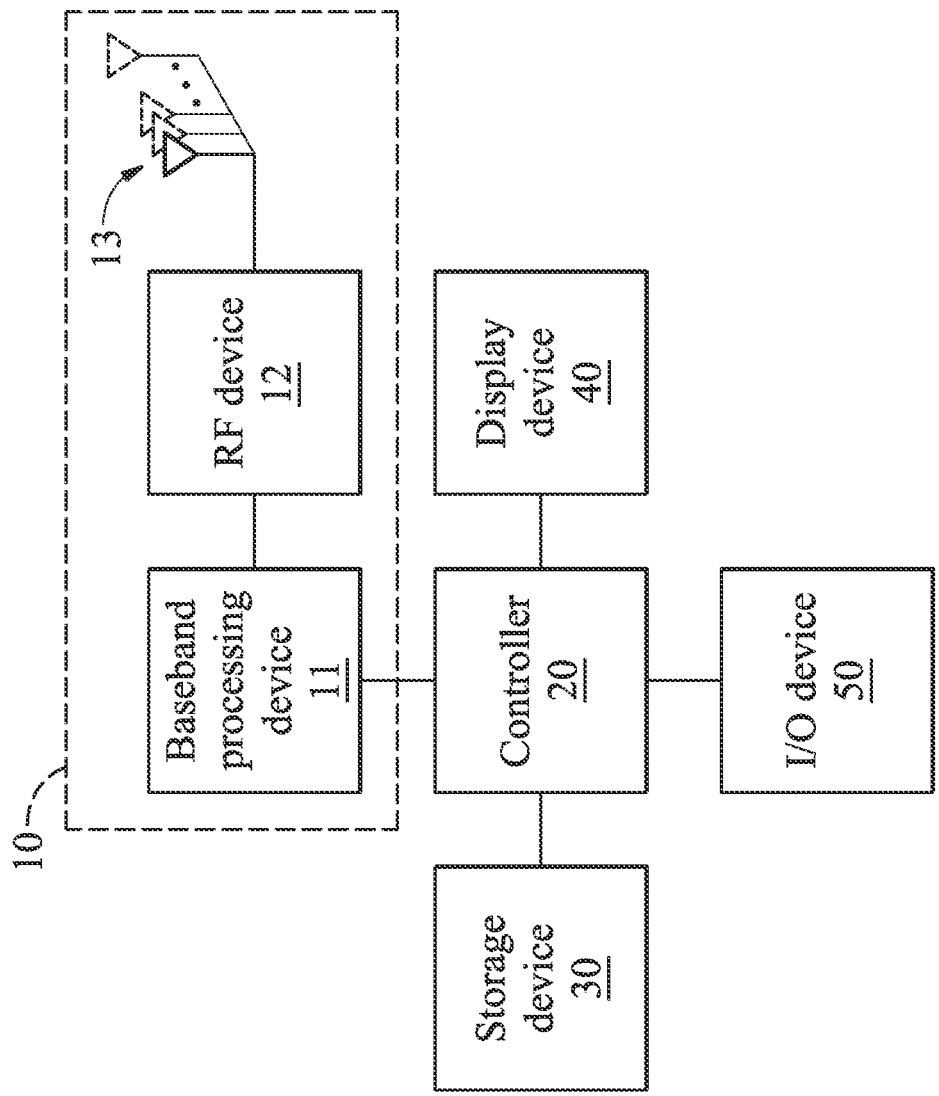
FIG. 2 is a block diagram illustrating a UE according to an embodiment of the application.

FIG. 2 is a block diagram illustrating a UE according to an embodiment of the application.

As shown in FIG. 2, a UE (e.g., the UE 110) may include a wireless transceiver 10, a controller 20, a storage device 30, a display device 40, and an Input/Output (I/O) device 50.

The wireless transceiver 10 is configured to perform wireless transmission and reception to and from the mobile communication network 120. Specifically, the wireless transceiver 10 may include a baseband processing device 11, a Radio Frequency (RF) device 12, and an antenna 13, wherein the antenna 13 may include an antenna array for beamforming.

The baseband processing device 11 is configured to perform baseband signal processing. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the mobile communication network 120, storing and retrieving data (e.g., the CAG information list) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 to perform the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a non-volatile memory, or a magnetic storage device, such as a hard disk or a magnetic tape, or an optical disc, or any combination thereof for storing data (e.g., the CAG information list), instructions, and/or program code of applications, communication protocols, and/or the method of the present application. In one example, the method of the present application may be implemented as part of a communication protocol (e.g., the 5G NR protocol). A 5G NR protocol stack may include a Non-Access-Stratum (NAS) layer to communicate with an AMF/SMF/MME entity in the core network 122, and an Access Stratum (AS) layer consisting of multiple sublayers, such as a Radio Resource Control (RRC) sublayer for high layer configuration and control of, a Packet Data Convergence Protocol/Radio Link Control (PDCP/RLC) sublayer, a Media Access Control (MAC) sublayer, and a Physical (PHY) sublayer.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 3:
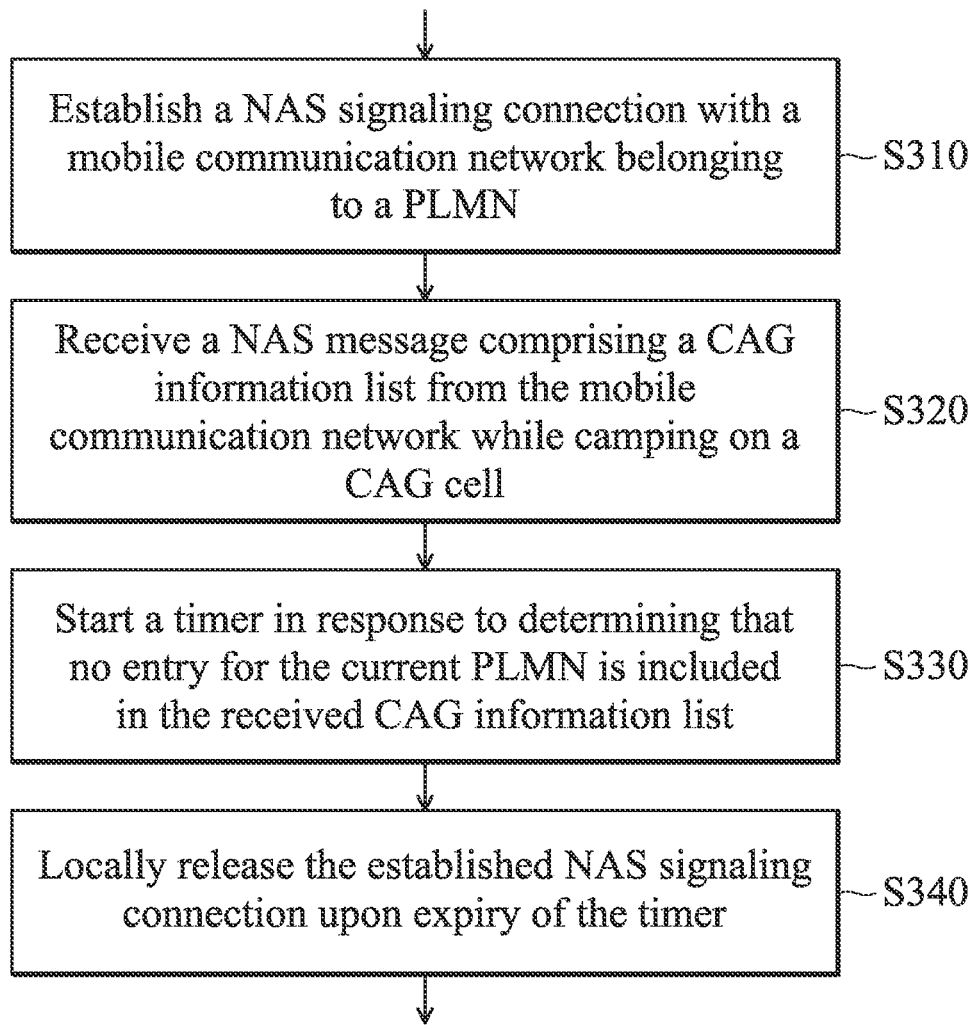
FIG. 3 is a flow chart illustrating the method for enhancing UE handling of NAS signaling connection release according to an embodiment of the application.

FIG. 3 is a flow chart illustrating the method for enhancing UE handling of NAS signaling connection release according to an embodiment of the application.

The method for enhancing UE handling of NAS signaling connection release may be applied to and executed by a UE (e.g., the UE 110) supporting CAG.

In step S310, the UE establishes a NAS signaling connection with a mobile communication network belonging to a PLMN. In one example, the established NAS signaling connection is an N1 NAS signaling connection for 5G System (5GS).

In step S320, the UE receives a NAS message comprising a CAG information list from the mobile communication network while camping on a CAG cell. In one example, the NAS message is a CONFIGURATION UPDATE COMMAND message which is used by the mobile communication network to initiate the configuration update procedure.

In step S330, the UE starts a timer in response to determining that no entry for the current PLMN is included in the received CAG information list. In one example, the timer is the timer T3540 for 5G System (5GS) as defined in the 3GPP Technical Specification (TS) 24.501. More specifically, the timer is started upon completion of the configuration update procedure if the UE does not have an emergency Protocol Data Unit (PDU) session and the UE received a CONFIGURATION UPDATE COMMAND message while camping on a CAG cell and the entry for the current PLMN in not included in the received "CAG information list". In other words, the timer may be started upon receiving the CONFIGURATION UPDATE COMMAND message.

The determination that no entry for the current PLMN is included in the received CAG information list may comprise: (1) determining that there is zero entry in the received CAG information list; or (2) determining that there is one or more entries in the received CAG information list but none of the entries is for the current PLMN.

In step S340, the UE locally releases the established NAS signaling connection upon expiry of the timer. Moreover, upon expiry of the timer, the UE enters a 5GMM-IDLE mode and searches for a suitable cell based on the received CAG information list.

Figure 4:
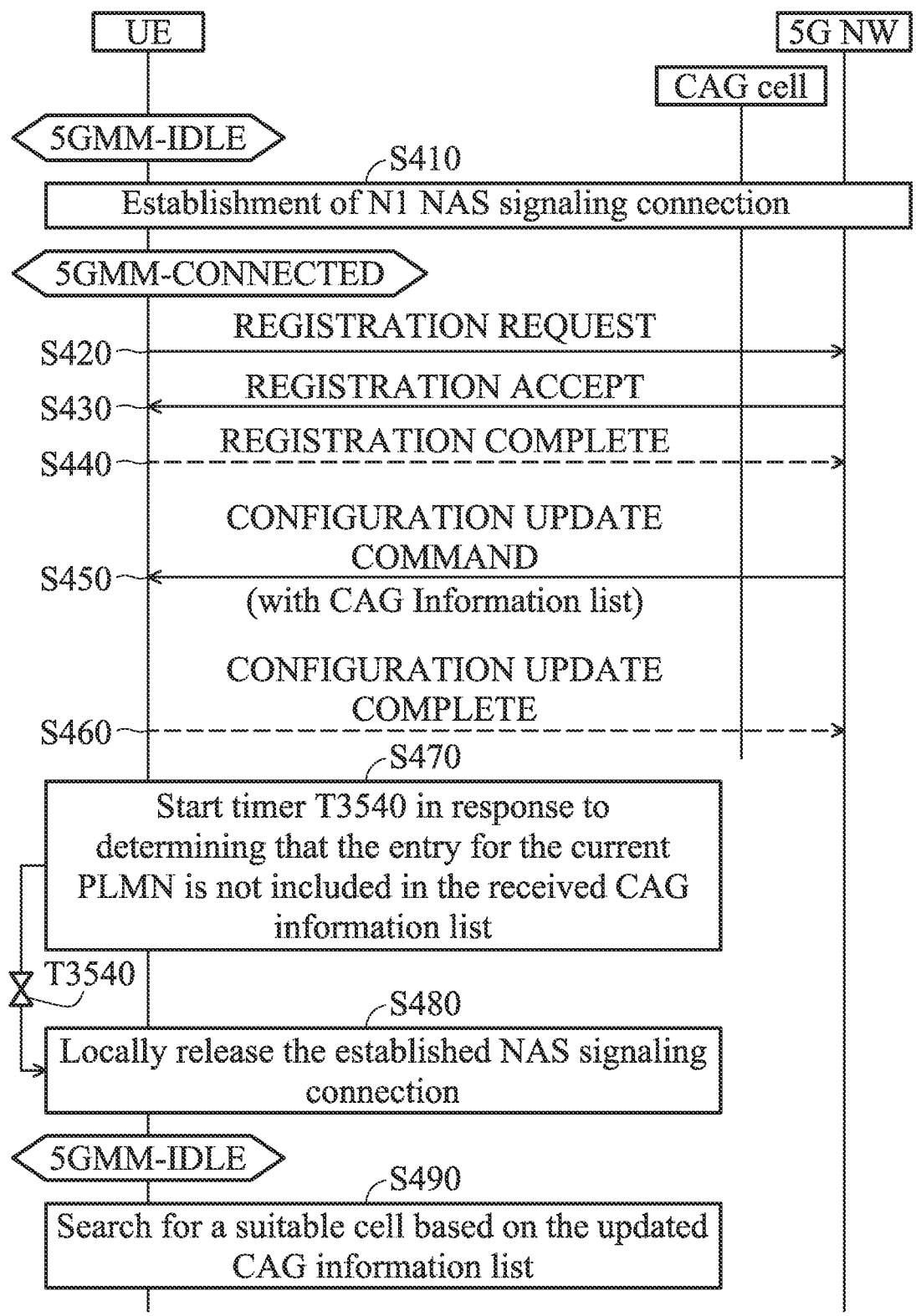
FIG. 4 is an exemplary message sequence chart illustrating the UE handling of NAS signaling connection release according to an embodiment of the application.

FIG. 4 is an exemplary message sequence chart illustrating the UE handling of NAS signaling connection release according to an embodiment of the application.

To begin with, the UE is initially in the 5GMM-IDLE mode.

In step S410, the UE performs establishment of N1 NAS signaling connection with the 5G network when camping on a CAG cell.

From the NAS layer perspective, the establishment of N1 NAS signaling connection may be performed by requesting the lower layer to establish an RRC connection, and upon indication from the lower layers that the RRC connection has been established, the UE may consider that the N1 NAS signaling connection is established and enter the 5GMM-CONNECTED mode.

In step S420, the UE sends a REGISTRATION REQUEST message to the 5G network when camping on the CAG cell.

Please note that although steps S410 and S420 are depicted as separate steps, they can be incorporated into a single step in which the REGISTRATION REQUEST message may be included in an RRC SETUP COMPLETE message during the establishment of N1 NAS signaling connection.

In step S430, the UE receives a REGISTRATION ACCEPT message from the 5G network when camping on the CAG cell.

Optionally, in step S440, the UE may return a REGISTRATION COMPLETE message to the 5G network if, e.g., the REGISTRATION ACCEPT message contained a 5G-Globally Unique Temporary UE Identity (5G-GUTI).

In step S450, the UE receives a CONFIGURATION UPDATE COMMAND message from the 5G network when camping on the CAG cell, wherein the CONFIGURATION UPDATE COMMAND message includes a CAG information list.

Optionally, in step S460, the UE may send a CONFIGURATION UPDATE COMPLETE message to the 5G network if "acknowledgement requested" is indicated in the Acknowledgement bit of the Configuration update indication Information Element (IE) in the CONFIGURATION UPDATE COMMAND message.

In step S470, the UE starts the timer T3540 in response to determining that the entry for the current PLMN is not included in the received CAG information list.

In step S480, if the NAS signaling connection is not released by the network before the expiry of the timer T3540, the UE locally releases the established NAS signaling connection upon expiry of the timer T3540.

After that, the UE enters the 5GMM-IDLE mode.

In step S490, the UE searches for a suitable cell based on the updated CAG information list.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A method, executed by a User Equipment (UE), comprising:
  establishing a Non-Access Stratum (NAS) signaling connection with a mobile communication network belonging to a Public Land Mobile Network (PLMN);
  receiving a NAS message comprising a Closed Access Group (CAG) information list from the mobile communication network while camping on a CAG cell;
  starting a timer in response to determining that no entry for a current PLMN is included in the received CAG information list; and
  upon expiration of the timer:
    i) locally releasing the established NAS signaling connection;
    ii) entering a 5GMM-IDLE mode; and
    iii) searching for a suitable cell in accordance with the received CAF information list;
  wherein the timer is a timer T3540 for 5G System (5GS).

2. The method as claimed in claim 1, wherein the determination that no entry for the current PLMN is included in the received CAG information list comprises:
  determining that there is zero entry in the received CAG information list; or
  determining that there is one or more entries in the received CAG information list but none of the none or more entries is for the current PLMN.

3. The method as claimed in claim 1, wherein the UE does not have an emergency Protocol Data Unit (PDU) session.

4. The method as claimed in claim 1, wherein the NAS message is a CONFIGURATION UPDATE COMMAND message.

5. The method as claimed in claim 4, wherein the timer is started upon receiving the CONFIGURATION UPDATE COMMAND message.

6. The method as claimed in claim 1, wherein the established NAS signaling connection is an N1 NAS signaling connection for 5G System (5GS).

7. A User Equipment (UE), comprising:
  a wireless transceiver, configured to perform wireless transmission and reception to and from a mobile communication network; and
  a controller, configured to establish a Non-Access Stratum (NAS) signaling connection with the mobile communication network belonging to a Public Land Mobile Network (PLMN) via the wireless transceiver, receive a NAS message comprising a Closed Access Group (CAG) information list from the mobile communication network via the wireless transceiver while camping on a CAG cell, start a timer in response to determining that no entry for a current PLMN is included in the received CAG information list, and upon expiry of the timer:
    i) locally release the established NAS signaling connection;
    ii) entering a 5GMM-IDLE state; and
    iii) searching for a suitable cell based on the received CAG information list;
  wherein the timer is a timer T3540 for 5G System (5GS).

8. The UE as claimed in claim 7, wherein the determination that no entry for the current PLMN is included in the received CAG information list comprises:
   determining that there is zero entry in the received CAG information list; or
   determining that there is one or more entries in the received CAG information list but none of the one or more entries is for the current PLMN.

9. The UE as claimed in claim 7, wherein the UE does not have an emergency Protocol Data Unit (PDU) session.

10. The UE as claimed in claim 7, wherein the NAS message is a CONFIGURATION UPDATE COMMAND message.

11. The UE as claimed in claim 10, wherein the timer is started upon receiving the CONFIGURATION UPDATE COMMAND message.

12. The UE as claimed in claim 7, wherein the established NAS signaling connection is an N1 NAS signaling connection for 5G System (5GS).

* * * * *